(12) United States Patent
Hayakawa et al.

(10) Patent No.: US 6,525,150 B1
(45) Date of Patent: Feb. 25, 2003

(54) OLEFIN POLYMERIZATION CATALYSTS AND OLEFIN POLYMER PRODUCTION METHODS USING SAID OLEFIN POLYMERIZATION CATALYSTS

(75) Inventors: Toshiyuki Hayakawa, Tokyo (JP); Fumio Tutumi, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/556,520

(22) Filed: Apr. 21, 2000

(30) Foreign Application Priority Data

Apr. 23, 1999 (JP) ............................. 11-117145

(51) Int. Cl.⁷ ................................. C08F 4/68
(52) U.S. Cl. .................... 526/169.2; 526/133; 526/161; 526/169; 502/128; 502/129; 502/171
(58) Field of Search ............... 526/161, 169.2, 526/169, 133; 502/128, 126, 171

(56) References Cited

FOREIGN PATENT DOCUMENTS

| EP | 0 371 411 | 6/1990 |
|---|---|---|
| JP | 60-35007 | 2/1985 |
| JP | 3-12406 | 1/1991 |
| JP | 3-163088 | 7/1991 |
| JP | 4-12283 | 3/1992 |
| JP | 5-230133 | 9/1993 |
| JP | 5/80493 | 11/1993 |
| JP | 6-192330 | 7/1994 |

OTHER PUBLICATIONS

A. Van Der Linden, et al., J. Am. Chem. Soc., vol. 117, No. 11, pp. 3008 to 3021, "Polymerization of βOlefins and Butadiene and Catalytic Cyclotrimerization of 1–Alkynes by a New Class of Group IV Catalysts. Control of Molecular Weight and Polymer Microstructure via Ligand Tuning in Stericallly Hindered Chelating Phenoxide Titanium and Zirconium Species", 1995.

*Primary Examiner*—Caixia Lu
(74) *Attorney, Agent, or Firm*—Oblon, Spivak, McClelland, Maier & Neustadt, P.C.

(57) ABSTRACT

Olefins are homopolymerized or copolymerized in the presence of a catalyst containing a reaction product obtained from vanadium oxytrichloride and 2,2'-thiobis(6-t-butyl-4-methylphenyl), an organic aluminum compound, such as trimethylaluminum, and an ionized ionic compound, such as N,N-dimethylanilinium tetrakis(pentafluorophenyl)borate, and the like. By using this catalyst to polymerize ethylene with an α-olefin, such as propylene, 1-heptene, 1-octene, and the like, or a non-conjugated diene, such as 5-ethylidene-2-norbornene, and the like, a polymer having a high degree of copolymerization is obtained.

10 Claims, No Drawings

OLEFIN POLYMERIZATION CATALYSTS AND OLEFIN POLYMER PRODUCTION METHODS USING SAID OLEFIN POLYMERIZATION CATALYSTS

BACKGROUND OF THE INVENTION

1. Field of the Art

This invention concerns olefin polymerization catalysts and olefin polymer production methods that use the olefin polymerization catalysts. More specifically, this invention concerns olefin polymerization catalysts, which contain prescribed compounds and with which α-olefins can be copolymerized efficiently, and olefin polymer production methods using these polymerization catalysts.

2. Prior Arts and Themes Thereof

Olefin polymers and olefin copolymers, as represented by polyethylene and polypropylene, are excellent in heat resistance, resistance against aging, chemical resistance, and the like, and are used as general-purpose resins in a wide variety of industrial fields, such as automobile parts, and the like. Ziegler-Natta catalysts, as represented by titanium catalysts, which are comprised of a titanium compound and an organic aluminum compound, and vanadium catalysts, which are comprised of a vanadium compound and an organic aluminum compound, are known as catalysts used in the production of such olefin polymers.

However, titanium catalysts are not adequate in polymerization activity. The olefin polymers that are obtained using titanium catalysts are therefore low in molecular weight and wide in molecular weight distribution. Also, olefin copolymers that are obtained using a titanium catalyst are insufficient in terms of random copolymerization, have a broad distribution of composition, and copolymers with adequate mechanical strength are thus difficult to obtain with this type of catalyst. Meanwhile, with vanadium catalysts, though the random copolymerization characteristics are improved, the composition distribution becomes narrow, and though the mechanical characteristics also become improved, these characteristics still cannot be considered to be sufficient.

Metallocene catalysts, comprised of a transition metal compound and an aluminoxane, have been proposed as catalysts that can take the place of Ziegler-Natta catalysts. For example, Japanese Patent Publication No. Hei-4-12283 discloses an olefin polymerization method using a catalyst comprised of a transition metal compound and an aluminoxane. A catalyst comprised of a zirconium hydride compound, having a group with conjugate π electrons as the ligand, and an aluminoxane is disclosed in Japanese Patent Publication No. Hei-5-80493. This patent publication also discloses a method for producing a polymer or copolymer with a molecular weight distribution (weight average molecular weight/number average molecular weight) of 1.97 to 2.15 by polymerizing ethylene or propylene or copolymerizing ethylene with an α-olefin of 3 to 10 carbons and a non-conjugated polyene of 5 to 20 carbons under the presence of the abovementioned catalyst.

Besides the abovementioned metallocene catalysts, it is also known that ethylene and an α-olefin can be copolymerized using metallocene compound, having a structure of silicon atoms, and the like, (Japanese Laid-open Patent Publication No. Sho-60-35007 and Japanese Laid-open Patent Publication No. Hei-3-12406), or using a geometrically constrained metallocene compound (CGCT: Japanese Laid-open Patent Publication No. Hei-3-163088).

However, the synthesis of a compound having a metallocene ligand (that is, a compound having a group with a cyclopentadiene ring structure as the ligand) requires a synthesis process of two to five stages. Also, if metallocene catalysts with one cyclopentadienyl group and non-cross-linked metallocene catalysts with two cyclopentadienyl groups are used, which can be synthesized relatively readily, the a-olefin polymerization activity is low and the ethylene—α-olefin copolymer that is produced has a low α-olefin content of approximately 5 weight %.

Besides metallocene catalysts, it is also known that olefins can be polymerized using a transition metal compound that is bonded with oxygen or another heteroatom. For example, Japanese Laid-open Patent Publication No. Hei-2-145606 discloses a method of polymerizing olefins using a product, obtained from bis(2-hydroxy-3-t-butyl-5-methylphenyl) sulfide and vanadium oxytrichloride, and methyl aluminoxane. However, a large quantity of methyl aluminoxane, which is expensive, must be used in this method.

Furthermore, Japanese Laid-open Patent Publication No. Hei-5-230133 and Japanese Laid-open Patent Publication No.Hei-6-192330 disclose methods of polymerizing olefins using 2,2'-thiobis(6-t-butyl-4-methylphenol) titanium dichloride, triisobutylaluminum, and a boron compound. However, a large quantity of triisobutylaluminum must be used in these methods.

SUMMARY OF THE INVENTION

Objects of the Invention

The present invention has been made to solve the above problems and an object thereof is to present olefin polymerization catalysts with which polymers of high molecular weight can be obtained at high yields. In particular, an object of the present invention is to provide olefin polymerization catalysts with which copolymerization of α-olefins with 4 or more carbons and especially 6 or more carbons can be performed at high yield. Another object of this invention is to provide catalysts with which the catalytic.components can be synthesized readily and with which the content of organic aluminum compound is low. Yet another object of this invention is to provide methods of producing olefin polymers using the abovementioned catalysts.

Features of the Invention

The olefin polymerization catalyst of the first aspect of this invention is characterized in containing a compound (a), which is expressed by the general formula (1) indicated below, a below-described compound (b), and a below-described compound (c).

Compound (a):

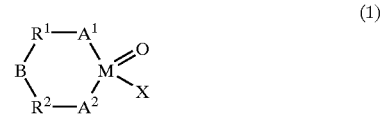
(1)

In formula, (1), each of $A^1$ and $A^2$ has an atom which is bonded to M and wherein $A^1$ and $A^2$ are selected from a substituted nitrogen atom, an oxygen atom, a substituted silicon atom, a substituted phosphorus atom a sulfur atom and a substituted sulfur atom, and $A^1$ and $A^2$ may be the same as or may differ from each other. Each of $R^1$ and $R^2$ is a hydrocarbon group with 1 to 20 carbons or a hydrocarbon group with 1 to 20 carbons and containing a heteroatom, $R^1$ and $R^2$ may be bonded together and be the same as or may differ from each other. Each of B has an atom which is bonded to the abovementioned $R^1$ and $R^2$ and is selected from a substituted nitrogen atom, an oxygen atom, a substituted phosphorus atm, a sulfur atom, a substituted sulfur atom, a substituted silicon atom, rind a carbon atom which is part of a curbonyl group. M is a metal atom of group 5 (VA) of the periodic table. X has an atom which is bonded to M and which is selected from a halogen atom, a carbon atom, a substituted nitrogen atom, an oxygen atom, a substituted silicon atom, a substituted phosphorus atom, a sulfur atom and a substituted sulfur atom.

Compound (b): Compound (b) is at least one type of compound selected from the group consisting of organic aluminum compounds expressed by the general formula (2) indicated below.

$$(R^3)_n AlZ_{3-n} \tag{2}$$

In formula (2), $R^3$ is a hydrocarbon group with 1 to 20 carbon atoms. Z is the hydrogen atom, a halogen atom, or an alkoxyl group. n takes on a value of 1 to 3.

Compound (c): Compound (c) is an ionized ionic compound.

The olefin polymerization catalyst of the second aspect of this invention is characterized in containing a reaction product (f), which is obtained by reacting a compound (d), expressed by the genera formula (3) indicated below, and a compound (e), expressed by the general formula (4) indicated below, a below-described compound (b), and a below-described compound (c).

$$\text{Compound (d): } M(O)X_3 \tag{3}$$

In formula (3), M is a metal atom of group 5 (VA) of the periodic table. X has an atom which is bonded to M and which is selected from a halogen atom, a carbon atom, a substituted nitrogen atom, an oxygen atom a substituted silicon atom, a substituted phosphorus atom, a sulfur atom and a substituted sulfur atom.

$$\text{Compound (e): } C^1-A^1-R^1-B-R^2-A^2-C^2 \tag{4}$$

In formula (4), each of $A^1$ and $A^2$ has an atom which is bonded to $C^1$ or $C^2$ and $A^1$ and $A^2$ are selected from a substituted nitrogen atom an oxygen atom, a substituted silicon atom, a substituted phosphorus atom, a sulfur atom, and a substituted sulfur atom, and $A^1$ and $A^2$ may be the same as or may differ from e other. Each of $R^1$ and $R^2$ is a hydrocarbon group with 1 to 20 carbons or a hydrocarbon group with 1 to 20 carbons containing a heteroatom. $R^1$ and $R^2$ may be bonded together and may be the same as or may differ from each other, Each of B has an atom which is bonded to the abovementioned $R^1$ and $R^2$ and B is selected from a substituted nitrogen atom, an oxygen atom, a substituted phosphorus atom, a sulfur atom, a substituted sulfur atom, a substituted silicon atom, and a carbon atom which is part of a carbonyl group. Each of $C^1$ and $C^2$ is one type of atom selected from a hydrogen atom, lithium atom, sodium atom, and potassium atom and $C^1$ and $C^2$ may be the same as or may differ from each other.

Compound (b): Compound (b) is at least one type of compound selected from the group consisting of organic aluminum compounds expressed by the general formula (2) indicated below.

$$(R^3)_n AlZ_{3-n} \tag{2}$$

In formula (2), $R^3$ is a hydrocarbon group with 1 to 20 carbon atoms. Z is a hydrogen atom, a halogen atom, or an alkoxyl group. n takes on a value of 1 to 3.

Compound (c): Compound (c) is an ionized ionic compound.

The olefin polymer production method of the third aspect of this invention is characterized in that an olefin is polymerized using the above-described polymerization catalyst of the first aspect of this invention.

The olefin polymer production method of the fourth aspect of this invention is characterized in that an olefin is polymerized using the above-described polymerization catalyst of the second aspect of this invention.

Effects of the Invention

The olefin polymerization catalysts of this invention make it possible for polymers of high degree of copolymerization and high molecular weights to be obtained at high yields. Also, with these catalysts, the catalytic components may be obtained by a simple method. Furthermore, the amount of expensive organic aluminum compound used can be made small. Residual catalysis can thus be prevented.

Also, the olefin polymerization catalysts of this invention are effective for the polymerization of olefins and, in particular, make it possible for polymers of high copolymerization properties and high molecular weights to be obtained.

Furthermore, the production methods of this invention make it possible for polymers of high degree of copolymerization and high molecular weights to be obtained at high yields.

DETAILED DESCRIPTION OF THE INVENTION

The present invention shall now be described in detail.

An olefin polymerization catalyst by this invention is characterized in containing the compound (a), expressed by the general formula (1) given above, the compound (b), and the compound (c).

With this invention, bonding shall refer to any type of bonding among conjugate bonding, ionic bonding, and ligand bonding. The bond may also be a σ bond or a π bond and may also be a bond that has both a σ bond and a π bond.

A characteristic of the compound (a) used in this invention is that an oxygen atom is double bonded to M.

Each of the abovementioned "$A^1$" and "$A^2$," which comprise the abovementioned "compound (a)," is a group having a prescribed atom bonded to M, which is a metal atom of group 5 (VA) of the periodic table, such as vanadium, niobium, and tantalum. The prescribed atom that is bonded to M is selected from a substituted nitrogen atom, an oxygen atom, a substituted silicon atom, a substituted phosphorus atom, a sulfur atom and a substituted sulfur atom. Examples of $A^1$ and $A^2$ include —N($R^4$)—, —O—, —O—Si($R^4$)($R^5$)—, —Si($R^4$)($R^5$)—, —P($R^4$)—, —P(O)($R^4$)—, —S—, —S(O)—, —S(O)$_2$—, —N{S(O)$_2$—$R^4$}—, —N{C(O)—$R^4$}—, where each of $R^4$ and $R^5$ is a hydrogen atom, a hydrocarbon group with 1 to 20 carbons, or a hydrocarbon group with 1 to 20 carbons and containing a heteroatom, and $R^4$ and $R^5$ may be the same as or may differ from each other. Each of $A^1$ and $A^2$ may for example have the structure, —N($R^4$)($R^5$)—, and the like, and the heteroatom coordinate to M.

Examples of the abovementioned "$R^1$" and "$R^2$" include groups expressed by the general formula (5) indicated below, groups expressed by the general formula (6) indicated below, the phenylene group, the naphthalene group, groups expressed by the general formula (7) indicated below, and groups expressed by the general formula (8) indicated below. $R^1$ and $R^2$ may be bonded to B in general formula (1) or may be bonded to each other.

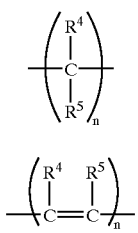

(5)

(6)

Each of the $R^4$ and $R^5$ in general formulae (5) and (6) is the hydrogen atom, halogen atom, a hydrocarbon group with 1 to 20 carbons, or a hydrocarbon group with 1 to 20 carbons and containing a heteroatom. $R^4$ and $R^5$ may be the same as or may differ from each other. Furthermore, n is an integer from 1 to 4.

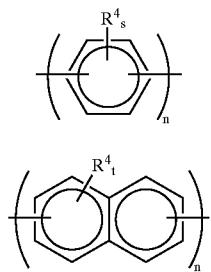

(7)

(8)

The $R^4$ in general formulae (7) and (8) is a halogen atom, a hydrocarbon group with 1 to 20 carbons, or a hydrocarbon group with 1 to 20 carbons and containing a heteroatom. s indicates the number of $R^4$'s that are bonded with the phenylene group and is an integer from 1 to 4. t indicates the number of $R^{41}$'s that are bonded with the naphthalene group and is an integer from 1 to 6. When s and/or t is 2 or greater, a plurality of $R^4$'s exist in the corresponding general formula and these $R^4$'s may be the same as or may differ from each other. Furthermore n is an integer from 1 to 4.

The abovementioned "B" has an atom that is bonded to both of $R^1$ and $R^2$. "B" is selected from a substituted nitrogen atom, an oxygen atom, a substituted phosphorus atom, a sulfur atom, a substitute sulfur atom, a substituted silicon atom, and a carbon atom which is part of a cabonyl group, Examples of B include —C(O)—, —O—, —N($R^4$)—, —P($R^4$)—, —P(O)($R^4$)—, —S—, —S—S—, —S(O)—, —S(O)$_2$—, Si($R^4$)($R^5$)—, where each of $R^4$ and $R^5$ is the hydrogen atom, a hydrocarbon group with 1 to 20 carbons, or a hydrocarbon group with 1 to 20 carbons and containing a heteroatom, and $R^4$ and $R^5$ may be s same as or may differ from each other.

If $R^1$ or $R^2$ is terminated by a heteroatom, for example, the oxygen atom, and B is —Si($R^4$)($R^5$)—, these $R^1$, $R^2$, and B will be expressed together as —O—Si($R^4$)($R^5$)—O—.

Furthermore, when $R^1$ and $R^2$ are bonded together as mentioned above and B is a below-mentioned atom, $R^1$, $R^2$, and B will collectively be a group mentioned below. For example, if B is the oxygen atom, $R^1$, $R^2$, and B will collectively be the furandiyl group, oxazolidene group, and the like., if B is the nitrogen atom, $R^1$, $R^2$, and B will collectively be the pyrollidine group, imidazolidine group, pyridinediyl group, quinolinediyl group, and the like., and if B is the sulfur atom, $R^1$, $R^2$, and B will collectively be the thiophenediyl group, thiazolidine group, and the like.

When the abovementioned "X" is a halogen group, examples of X include fluorine, chlorine, bromine, iodine, and the like. When X is a group having a prescribed atom that is bonded to M, examples of this group will include —C($R^4$)($R^5$)($R^6$), —CH$_2$—Si($R^4$)($R^5$)($R^6$), —C(O)($R^4$), —N($R^4$)($R^5$), —OR$^4$—, —O—Si—($R^4$) ($R^5$)($R^6$), —Si($R^4$) ($R^5$)($R^6$), —P($R^4$)($R^5$)—, —P(O)($R^4$)($R^5$), —SR$^4$, —S(O) ($R^4$), —S(O)$_2$($R^4$), and the like., (where each of $R^4$, $R^5$, and $R^6$ is the hydrogen atom, a hydrocarbon group with 1 to 20 carbons, or a hydrocarbon group with 1 to 20 carbons and containing a heteroatom, respectively, and R4, $R^5$, and $R^6$ may be the same as or may differ from each other).

Examples of the abovementioned "$R^3$" in the organic aluminum compounds expressed by formula (2) among the abovementioned "compound (b)" include the methyl group, ethyl group, n-propyl group, t-butyl group, isobutyl group, n-hexyl group, n-octyl group, phenyl group, benzyl group, and the like. Among these it is especially preferable for $R^3$ to be the methyl group, ethyl group, t-butyl group, or isobutyl group.

When the abovementioned "Z" is a halogen atom, it is especially preferable for Z to be the chlorine atom and/or the bromine atom. When Z is an alkoxyl group, Z may be the methoxy group, ethoxy group, n-propoxy group, or n-butoxy group, and among these it is especially preferable for Z to be the methoxy group, ethoxy group, or n-butoxy group.

Among the candidates for compound (b), examples of the organic aluminum compound expressed by general formula (2) include trialkylaluminums, alkylaluminum halides, alkylaluminum hydrides, and alkylaluminum alkoxides.

Of the above, examples of trialkylaluminums include trimethylaluminum, triethylaluminum, tributylaluminum, triisobutylaluminum, tri-t-butylaluminum, triisopropylaluminum, triamylaluminum, and the like.

Examples of alkylaluminum halides include dimethylaluminum chloride, methylaluminum dichloride, diethylaluminum chloride, ethylaluminum dichloride, diisopropylaluminum chloride, isopropylaluminum dichloride, diisobutylaluminum chloride, isobutylaluminum dichloride, di-t-butylaluminum chloride, t-butylaluminum dichloride, diamylaluminum chloride, amylaluminum dichloride, trimethyl dialuminum trichloride, triethyl dialuminum trichloride, and the like.

Examples of alkylaluminum hydrides include dimethylaluminum hydride, diisobutylaluminum hydride, dioctylaluminum hydride, and the like.

Examples of alkylaluminum alkoxides include methylaluminum dimethoxide, diisobutylaluminum methoxide, isobutylaluminum ethoxide, and the like.

Compound (b) may also be an aluminoxane. With regard to these compounds (b), two or more types of compound selected from among the group of organic aluminum compounds expressed by general formula (2) and the group of aluminoxanes may be used in combination.

Of the abovementioned compounds (b) the use of a trialkylaluminum is preferable since. its catalytic activity is high. Among trialkylaluminums, the use of trimethylaluminum, triethylaluminum, or triisobutylaluminum is especially preferable.

The ionized ionic compound, which is the abovementioned "compound (c)" refers to a compound, which has at least one anion and at least one cation at the same time in the molecule and can exist as an ion in the solvent and/or medium used in carrying out polymerization using a catalyst of this invention.

Examples of this compound (c) include compounds of the following general formula (9).

$$\{(L)^{k+}\}_P\{(M'A'A^2\cdots A^n)^-\}_q \qquad (9)$$

In the above formula,$(L)^{k+}$ is a cation, M' is an element selected from groups 13 (IIIB), 14(IVB), and 15(VB) of the periodic table, each of $A^1$, $A^2$, ⋯ An is a group selected from a hydrogen atom, halogen atoms, alkyl groups with 1 to 20 carbons, dialkylamino groups with 1 to 30 carbons, alkoxyl groups with 1 to 20 carbons, aryl groups with 6 to 40 carbons, aryloxy groups with 6 to 40 carbons, alkaryl groups with 7 to 40 carbons, aralkyl groups with 7 to 40 carbons, halogen-substituted hydrocarbon groups with 1 to 40 carbons, acyloxy groups with 1 to 20 carbons, and organometalloid groups, and these groups may be the same as or may differ from each other. k is the valence number of L and is an integer from 1 to 3. p is an integer equal to or greater than 1 that satisfies q (k×p).

Examples of compound (c) include trimethylammonium tetraphenylborate ($[Me_3(H)N]^+[Ph_4B]^-$), triethylammonium tetraphenylborate, tributylammonium tetraphenylborate, methyl(dibutyl)ammonium tetraphenylborate, N,N-dimethylanilinium tetraphenylborate, methylpyridinium tetraphenylborate, methyl(2-cyanopyridinium) tetraphenylborate, methyl(4-cyanopyridinium) tetraphenylborate, triphenylcarbenium tetraphenylborate, ferrocenium tetraphenylborate, trimethylammonium tetrakis(pentafluorophenyl)borate, triethylammonium tetrakis(pentafluorophenyl)borate, tributylammonium tetrakis(pentafluorophenyl)borate, methyl(dibutyl)ammonium tetrakis(pentafluorophenyl)borate, N,N-dimethylanilinium tetrakis(pentafluorophenyl)borate, methylpyridinium tetrakis(pentafluorophenyl)borate, methyl(2-cyanopyridinium) tetrakis(pentafluorophenyl)borate, methyl(4-cyanopyridinium) tetrakis(pentafluorophenyl)borate, triphenylcarbenium tetrakis(pentafluorophenyl)borate, ferrocenium tetrakis(pentafluorophenyl)borate, N,N-dimethylammonium tetrakis[3,5-bis(trifluoromethyl)phenyl]borate, triphenylmethyl tetrakis[3,5-bis(trifluoromethyl)phenyl]borate, silver tetraphenylborate, sodium tetraphenylborate, silver tetrafluoroborate, triphenylcarbenium tetrafluoroborate, and the like. Of these, the use of N,N-dimethylanilinium tetrakis(pentafluorophenyl)borate is especially preferable due to its high catalytic activity. Two or more types of compound (c) may be mixed and used.

The olefin polymerization catalyst of another aspect of this invention is characterized in containing a reaction product (f), which is obtained by reacting a compound (d), expressed by the general formula (3) given above, and a compound (e), expressed by the general formula (4), and a compound (b), and a compound (c).

With this invention, bonding shall refer to any type of bonding among conjugate bonding, ionic bonding, and ligand bonding. The bond may also be a σ bond or a π bond and may also be a bond that has both a σ bond and a π bond.

A characteristic of the compound (d) used in this invention is that an oxygen atom is double bonded to M.

The "M" and "X" of the abovementioned "compound (d)" are respectively the same as the "M" and "X" of compound (a) of the above-described first aspect of this invention.

The "$A^1$," "$A^2$," "A B," "$R^1$," and "$R^2$" of the abovementioned "compound (e)" are respectively the same as the "$A^1$," "$A^2$," "B," "$R^1$," and "$R^2$" of compound (a) of the above-described first aspect of this invention. Though each of "$C^1$" and "$C^2$" is not restricted in particular as long as it is one type of atom selected from among the hydrogen atom, lithium atom, sodium atom, and potassium atom, the hydrogen atom is preferable since a compound (e) with which "$C^1$" and "$C^2$" are hydrogen atoms are easy to synthesize.

Examples of compound (e) include 2,2'-thiobis(4,6-dimethylphenol), 2,2'-thiobis(6-t-butyl-4-methylphenol), 2,2'-thiobis(4-methyl-6-triisopropylsilylphenol), 2,2'-thiobis(4,6-dichlorophenol), 2,2'-thiobis(N-methylaniline), 2,2'-thiobis(N-t-butylaniline), 2,2'-sulfinylbis(6-t-butyl-4-methylphenol), 2,2'-oxybis(6-t-butyl-4-methylphenol), 2,2'-sufonylbis(6-t-butyl-4-methylpehnol), 2,2'-oxybis(6-t-butyl-4-methylphenol), 2,2'-oxybis(N-methylaniline), 2,2'-oxybis(N-t-butylaniline), 2,6-bis(3-t-butyl-2-hydroxy-5-methylphenyl)furan, bis(N-phenylaminoethyl) ether, bis{N-(2,6-dimethyl)phenylaminoethyl} ether, bis{N-(2,6-diisopropyl)phenylaminoethyl} ether, bis(N-t-butylaminoethyl) ether, bis(N-phenylaminoethyl) sulfide, bis{N-(2,6-dimethyl)phenylaminoethyl} sulfide, bis{N-(2,6-diisopropyl)phenylaminoethyl} sulfide, bis(N-t-butylaminoethyl) sulfide, and the like. Among these, the use of 2,2'-thiobis(6-t-butyl-4-methylphenol) is preferable since it is high in catalytic activity. Furthermore, the abovementioned "compound (b)" and "compound (c)" are respectively the same as compound (b) and compound (c) described above for the first aspect of the invention.

In the first and second aspects of this invention, a heteroatom may be a halogen atom.

The solvent and/or medium to be used to supply the olefin polymerization catalyst of this invention that contains compound (a), compound (b), and compound (c) or the olefin polymerization catalyst of this invention that contains reaction product (f), compound (b), and compound (c) to the polymerization system are not restricted in particular, and benzene, toluene, xylene, pentane, hexane, cyclohexane, methylene chloride, monochrolobenzene, and the like., may be used.

Also, at least one type of compound among the respective abovementioned compounds may be used upon being carried on a carrier. Though this carrier is not restricted in particular, inorganic oxides, such as silica, alumina, silica alumina, titania, magnesia, and the like., inorganic compounds, such as magnesium chloride, and the like., and/or organic compounds may be used. The method of making the compound be carried on such a carrier is not restricted in particular and a known method may be used as suitable.

With the olefin polymerization catalysts of this invention, it is especially preferable to use trialkylaluminum as compound (b) and to use N,N-dimethylanilinium tetrakis(pentafluorophenyl)borate as compound (c).

Though the blending ratio of compound (a), compound (b), and compound (c) to be contained in the olefin polymerization catalyst of the first aspect of this invention is not restricted in particular, blending is preferably performed so that compound (b)/compound (a) will be 0.01 to 20000 (or more preferably 0.1 to 10000 and even more preferably, 1 to 1000). Also blending is preferably performed so that compound (c)/compound (a) will be 0.01 to 1000 (or more preferably 0.1 to 100 and even more preferably 0.5 to 10).

Also, though the blending ratio of reaction product (f), compound (b), and compound (c) to be contained in the olefin polymerization catalyst of the second aspect of this invention is not restricted in particular, blending is preferably performed so that compound (b)/compound (f) will be 0.01 to 20000 (or more preferably 0.1 to 10000 and even more preferably, 1 to 1000). Also blending is preferably performed so that compound (c)/compound (f) will be 0.01 to 1000 (or more preferably 0.1 to 100 and even more preferably 0.5 to 10).

Furthermore with this invention, the method of supplying the catalyst to the polymerization system is not restricted in particular and each of compound (a) or reaction product (f), compound (b), and compound (c) may be supplied separately or two or more of the components may be mixed priorly and then supplied.

The "olefin" that can be polymerized by the olefin polymerization catalysts of this invention is not restricted in particular. The catalysts may also be used favorably for both homopolymerization and copolymerization of olefins. In cases of use in copolymerization of an olefin, the catalysts of this invention are especially high in the ability to copolymerize α-olefins and enable copolymers of high molecular weight to be obtained.

The olefin is preferably an α-olefin with an olefinic double bond at the a position and is more preferably such an olefin with 2 to 20 carbons. This α-olefin may be a chain olefin or an annular olefin and furthermore, may be a non-polar olefin or a polar olefin. Examples of chain olefins that correspond to being such an α-olefin include ethylene, propylene, 1-butene, 1-hexene, 4-methyl-1-pentene, 1-heptene, 1-octene, 1-decene, and the like.

Examples of cyclic olefins include norbornene, and the like.

Examples also include substituted derivatives of such annular olefins, such as derivatives obtained by substitution by an alkyl group, alkylidene group, aromatic group, and the like., and derivatives obtained by a polar group, such as a halogen atom, hydroxyl group, ester group, alkoxyl group, cyano group, amido group, imido group, silyl group, and the like. Examples of such substituted derivatives include 2-norbornene, 5-methyl-2-norbornene, 5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbornyl-2-norbornene, 5-phenyl-2-norbornene, 5-pheynyl-5-methyl-2-norbornene, and the like.

Examples of acrylic acid esters, methacrylic acid esters, acrylonitrile compounds, and the like., which are polar olefins, include methyl methacrylate, ethyl methacrylate, propyl methacrylate, acrylonitrile, methacrylonitrile, and the like. Furthermore, the olefins in this invention include styrene and the derivatives thereof. Two or more types of such various olefins may be mixed and used.

Of the olefins given above, the catalysts of this invention may be used especially favorably in the polymerization of ethylene, propylene, butene, 1-hexene, and 1-octene and in the copolymerization of ethylene and another α-olefin.

Also, conjugated dienes and/or non-conjugated dienes may be used in the copolymerization. A non-conjugated diene is preferably used to obtain a copolymer with cross-linking properties.

When such non-conjugated dienes are classified into those that can form branch chains in the copolymer that is produced and those that cannot form a branch chains in the copolymer that is produced, examples of non-conjugated dienes that can form branch chains include dicyclopentadiene, 2,5-norbornadiene, as well as aliphatic α, ω-dienes with 6 to 20 carbons, such as 1,5-hexadiene, 1,6-heptadiene, 1,7-octadiene, 1,8-nonadiene, and 1,9-decadiene. On the other hand, examples of non-conjugated dienes that cannot form branch chains include 5-ethylidene-2-norbornene, 1,4-hexadiene, 4-methyl-1,4-hexadiene, 5-methyl-1,4-hexadiene, 7-methyl-1,6-octadiene, and the like. Though two or more types of such non-conjugated dienes may be mixed and used, it is preferable to use a combination of at least one type of diene selected from among the abovementioned non-conjugated dienes that can form branch chains and non-conjugated dienes that cannot form branch chains.

An olefin polymer production method of this invention is characterized in that an above-described polymerization catalyst of the first aspect of this invention is used to polymerize an olefin. This production method is particularly favorable for the copolymerization of ethylene and another α-olefin. Another olefin polymer production method of this invention is characterized in that an above-described polymerization catalyst of the second aspect of this invention is used to polymerize an olefin. This production method is particularly favorable for the copolymerization of ethylene and another α-olefin.

The olefins that can be polymerized by this invention are not limited in particular and the same olefins as those indicated above may be used.

The polymerization and copolymerization of olefins by the polymerization methods of this invention may be carried out in solution or in a slurry. The solvent and/or medium to be used in carrying out this polymerization in solution or in slurry is not restricted in particular as long as it is a solvent that can be used for the polymerization or copolymerization of an olefin. Examples include benzene, toluene, xylene, pentane, hexane, cyclohexane, methylene chloride, and the like. In addition, the olefin itself may be used as the solvent and/or medium. Two or more types of such solvents and media may be mixed and used.

Though the temperature for olefin polymerization or copolymerization is not restricted in particular, the polymerization or copolymerization is preferably carried out in the temperature range of −100 to 300° C. and more preferably in the temperature range of −20 to 200° C.

Though the pressure is also not restricted in particular, the polymerization or copolymerization is preferably carried out in the pressure range of 0.5 to 1500 atmospheres and more preferably in the pressure range of 1 to 500 atmospheres.

Furthermore, the polymerization can be carried out either by a continuous method or a batch method. Also, hydrogen or other chain transfer agent for adjusting the molecular weight may be added.

Preferred Examples of the Invention

This invention shall now be described in more detail by way of examples.

The various characteristics of the polymers and copolymers obtained in these examples were measured by the following methods.

(1) α-olefin content By $^1$H-NMR.

(2) Weight average molecular weight and number average molecular weight Measurements were made at 135° C., using a gel permeation chromatography device (Model "150C"; manufactured by Waters Corp.) and o-dichlorobenzene as the solvent. The measurement results are polystyrene-equivalent values for both types of molecular weight. The degree of dispersion (shall also be referred to hereinafter as "Mw/Mn") was calculated using the weight average molecular weight (shall also be referred to hereinafter as "Mw") and the number average molecular weight (shall also be referred to hereinafter as "Mn").

An outline of the test conditions and the results for examples 1–10 and comparative examples 1–6 described below are shown collectively in Tables 1 and 2.

Example 1

Copolymerization of Ethylene and 1-Octene

1̂ Preparation of Reaction Product (f)

0.52 g (3.0 mmol) of vanadium oxytrichloride {compound (d)} was dissolved in 30 ml of dried n-hexane, and into this solution, the temperature of which was maintained at −50° C., was dripped and mixed an n-hexane solution having 1.1 g (3.0 mmol) of 2,2'-thiobis(6-t-butyl-4-methylphenol) {compound (e)} dissolved therein. Thereafter, the temperature was raised gradually and stirring was performed for 9 hours at room temperature (20 to 25° C.). The blackish-purple precipitate that was produced was then recovered by centrifugal separation and dried under vacuum to obtain a reaction product containing 1.3 g of reaction product (f).

The $^1$H-NMR (CD$_2$Cl$_2$) measurement results for this reaction product are as follows:

7.28 ppm (s, 2H), 7.22 ppm (s, 2H), 2.34 ppm (s, 6H), and

TABLE 1

|  | Example 1 | Example 2 | Example 3 | Example 4 | Example 5 | Example 6 | Example 7 | Example 8 | Example 9 | Example 10 |
| --- | --- | --- | --- | --- | --- | --- | --- | --- | --- | --- |
| Olefin | Ethylene 1-octene | Ethylene 1-octene | Ethylene 1-octene | Ethylene Propylene | Ethylene 1-butylene | Ethylene-1-butene E-NOR | Ethylene 1-octene | Ethylene 1-octene | Ethylene 1-octene | Ethylene 1-octene |
| Reaction product (f) (amount used: mg) | v = contains O, S (6.9) | v = contains O, S (2.3) | v = contains O, S (6.9) | v = contains O, S (2.3) | v = contains O, S (2.3) | v = contains O, S (2.3) | v = contains O, S (1.2) | v = contains O, S (1.2) | v = contains O, S (1.2) | v = contains O, S (1.2) |
| Compound (b) (amount used: μ mol) | Me$_3$Al (1500) | Me$_3$Al (50) | (i-Bu)$_3$Al (7500) | Me$_3$Al (50) | Me$_3$Al (250) | Me$_3$Al (250) | Me$_3$Al (50) | Me$_3$Al (50) | Me$_3$Al (50) | Me$_3$Al (50) |
| Compound (c) (amount used: μ mol) | B/N compound (30) | B/N compound (10) | B/N compound (30) | B/N compound (10) | B/N compound (10) | B/N compound (10) | B/N compound (5) | B/N compound (5) | B/N compound (5) | B/N compound (5) |
| Polymer yield (g) | 27.9 | 16.3 | 5.4 | 25.3 | 16.1 | 16.5 | 17.4 | 37.7 | 32.5 | 7.7 |
| α-olefin content (mole %) | 25.6 | 27.9 | 24.4 | 52 | 45.2 | 42.9 | 35.0 | 26.8 | 36.7 | 33.4 |
| Molecular weight (Mw) (×10$^5$) | 10.4 | 16.4 | 9.6 | 5.8 | 11.9 | 8.9 | 8.3 | 5.9 | 11.1 | 13.7 |
| Mw/Mn | 3.1 | 4.1 | 2.7 | 4.1 | 3.8 | 2.7 | 2.4 | 1.9 | 2.1 | 3.1 |

TABLE 2

|  | Comparative example 1 | Comparative example 2 | Comparative example 3 | Comparative example 4 | Comparative example 5 | Comparative example 6 |
| --- | --- | --- | --- | --- | --- | --- |
| Olefin | Ethylene 1-octene | Ethylene 1-octene | Ethylene 1-octene | Ethylene Propylene | Ethylene Propylene | Ethylene 1-octylene |
| Reaction product (f) (amount used: mg) | v = contains O, S (6.9) | Does not contain S (6.6) | VCl4, contains S (7.2) | v = contains O, S (2.3) | v = contains O, S (2.3) | TiCl4, contains S (2.4) |
| Compound (b) (amount used: μ mol) | Me$_3$Al (1500) | Me$_3$Al (1500) | Me$_3$Al (1500) | Al—O (50) | Al—O (500) | Me$_3$Al (50) |
| Compound (c) (amount used: μ mol) | None | B/N compound (30) | B/N compound (30) | None | None | B/N compound (5) |
| Polymer yield (g) | 0.2 | x | 0.98 | x | 10.1 | 0.53 |
| α-olefin content (mole %) | 9.4 | x | 18.1 | x | 33.5 | 8.9 |
| Molecular weight (Mw) (×10$^5$) | x | x | x | x | x | x |
| Mw/Mn | x | x | x | x | x | x |

1.34 ppm (s, 18H).

2 Copolymerization of Ethylene and 1-Octene 950 ml of n-hexane and 50 ml of 1-octene were placed in a flask of 2-liter internal volume that had been replaced adequately with nitrogen, and while maintaining the temperature at 30° C., ethylene was made to flow in at a flow rate of 5 liters/minute for 10 minutes and thereby dissolved. Thereafter, 1.5 mmol of trimethylaluminum {compound (b)}, which was dissolved in n-hexane, 6.0 mg of the reaction product obtained in 1 above, which was dissolved in toluene, and 30 μmol of N,N-dimethylanilinium tetrakis(pentafluorophenyl)borate {compound (c)} were added to the abovementioned flask to start polymerization. During the polymerization reaction, the interior of the flask was maintained at 30° C. and ethylene was supplied continuously at a flow rate of 5 liters/minute. After the elapse of 20 minutes, 5 ml of methanol were added to stop the polymerization reaction. An anti-aging agent was then added and the polymer was recovered by steam stripping and then dried. 27.9 g of polymer were obtained as a result. The 1-octene content of this polymer was 25.8 mol %, the Mw was 10.4×10$^5$, and the Mw/Mn was 3.1.

Example 2

Copolymerization of Ethylene and 1-Octene

Ethylene and 1-octene were copolymerized in the same manner as in 2 of example 1 with the exception that the usage amount of trimethylaluminum {compound (b)} was 50 μ mol, the usage amount of the reaction product obtained in 1 of the first example was 2.3 mg, and the usage amount of N,N-dimethylanilinium tetrakis(pentafluorophenyl) borate {compound (c)} was 10 μ mol. 16.3 g of polymer were obtained as a result. The 1-octene content of this polymer was 27.9 mol %, the Mw was 16.4×10$^5$, and the Mw/Mn was 4.1.

Example 3

Copolymerization of Ethylene and 1-Octene

Ethylene and 1-octene were copolymerized in the same manner as in 2 of example 1 with the exception that triisobutylaluminum was used in place of trimethylaluminum at a usage amount of 7.5 mmol. 5.4 g of polymer were obtained as a result. The 1-octene content of this polymer was 24.4 mol %, the Mw was 9.6×10$^5$, and the Mw/Mn was 2.7.

Example 4

Copolymerization of Ethylene and Propylene 1000 ml of n-hexane were placed in a flask of 2-liter internal volume that had been replaced adequately with nitrogen, and while maintaining the temperature at 30° C., ethylene and propylene were respectively made to flow in at a flow rate of 5 liters/minute for 10 minutes and thereby dissolved. Thereafter, 50 μ mol of trimethylaluminum {compound (b)}, which was dissolved in n-hexane, 2.3 mg of the reaction product obtained in 1̂ above, which was dissolved in toluene, and 10 μ mol of N,N-dimethylanilinium tetrakis (pentafluorophenyl)borate {compound (c)} were added into the abovementioned flask to start polymerization. During the polymerization reaction, the interior of the flask was maintained at 30° C. and ethylene and propylene were respectively supplied continuously at a flow rate of 5 liters/minute. After the elapse of 20 minutes, 5 ml of ethanol were added to stop the polymerization reaction. An anti-aging agent was then added and the polymer was recovered by steam stripping and then dried. 25.3 g of polymer were obtained as a result. The propylene content of this polymer was 52.0 mol %, the Mw was $5.8 \times 10^5$, and the Mw/Mn was 4.1.

Example 5

Copolymerization of Ethylene and 1-Butene 600 ml of n-hexane, 0.25 mmol of trimethylaluminum dissolved in n-hexane, and 100 ml of 1-butene were added to an autoclave of 1-liter internal volume which had been replaced adequately with nitrogen, and while maintaining the temperature at 30° C., pressurization by ethylene was performed so as to maintain a pressure of 4 kg/cm2. Thereafter, while maintaining the temperature at 40° C., 2.3 mg of the reaction product obtained in 1̂ above, which was dissolved in toluene and 10 μ mol of N,N-dimethylanilinium tetrakis(pentafluorophenyl)borate were added to start polymerization. During the polymerization reaction, the interior of the autoclave was maintained at 40° C., and after the elapse of 15 minutes, 5 ml of ethanol were added to stop the polymerization reaction. An anti-aging agent was then added and the polymer was recovered by steam stripping and then dried. 16.1 g of polymer were obtained as a result. The 1-butene content of this polymer was 45.2 mol %, the Mw was $11.9 \times 10^5$ and the Mw/Mn was 3.8.

Example 6

Copolymerization of Ethylene, 1-Butene, and 5-Ethylidene-2-Norbornene

Besides adding 2.0 ml of 5-ethylidene-2-norbornene (E-NOR) at the same time as the 1-butene, and the like., polymerization was performed in the same manner as example 5. 16.5 g of polymer were obtained as a result. The 1-butene content of this polymer was 42.9 mol %, the iodine value was 16.7, the Mw was $8.9 \times 10^5$, and the Mw/Mn was 2.7. The iodine value was measured by the iodine titration method.

Example 7

Copolymerization of Ethylene and 1-Octene

Ethylene and 1-octene were copolymerized in the same manner as example 2 with the exception that the reaction product obtained in 1̂ of the first example and N,N-dimethylanilinium tetrakis(pentafluorophenyl)borate were respectively dissolved in methylene chloride, with the usage amount of the reaction product obtained in 1̂ of the first example being 1.2 mg and the usage amount of N,N-dimethylanilinium tetrakis(pentafluorophenyl)borate being 5 μ mol. 17.4 g of polymer were obtained as a result. The 1-octene content of this polymer was 35.0 mol %, the Mw was $8.3 \times 10^5$, and the Mw/Mn was 2.4.

Example 8

Copolymerization of Ethylene and 1-Octene

Ethylene and 1-octene were copolymerized in the same manner as example 7 with the exception that the n-hexane solution of trimethylaluminum, the methylene chloride solution of the reaction product obtained in 1̂ of example 1, and the methylene chloride solution of N,N-dimethylanilinium tetrakis(pentafluorophenyl)borate were added to a 100 ml flask, the interior of which had been adequately replaced with nitrogen, and after stirring for one minute, this mixture was added to the 2 liter flask for polymerization to start polymerization. 37.7 g of polymer were obtained as a result. The 1-octene content of this polymer was 26.8 mol %, the Mw was $5.9 \times 10^5$, and the Mw/Mn was 1.9.

Example 9

Copolymerization of Ethylene and 1-Octene

Ethylene and 1-octene were copolymerized in the same manner as example 7 with the exception that 950 ml of methylene chloride were used in place of n-hexane as the polymerization solvent. 32.5 g of polymer were obtained as a result. The 1-octene content of this polymer was 36.7 mol %, the Mw was $11.1 \times 10^5$, and the Mw/Mn was 2.1.

Example 10

Copolymerization of Ethylene and 1-Octene

1̂ Preparation of Reaction Product (f)

Reaction product (f) was prepared in the same manner as in 1̂ of example 1 with the exception that 1.1 g of 2,2'-sulfinylbis(6-t-butyl-4-methylphenol) were used in place of 2,2'-thiobis(6-t-butyl-4-methylphenol). As a result, a dark-blue solid containing 1.4 g of reaction product (f) was obtained.

2̂ Copolymerization of Ethylene and 1-Octene

Ethylene and 1-octene were copolymerized in the same manner as example 7 with the exception that 1.2 mg of the reaction product obtained in 1̂ of example 10 were used in place of the reaction product obtained in 1̂ of example 1. 7.7 g of polymer were obtained as a result. The 1-octene content of this polymer was 33.4 mol %, the Mw was $13.7 \times 10^5$, and the Mw/Mn was 3.1.

Comparative Example 1

Copolymerization of Ethylene and 1-Octene

Besides not using N,N-dimethylanilinium tetrakis (pentafluorophenyl)borate, polymerization was carried out in the same manner as in 2̂ of example 1. 0.2 g of polymer were obtained as a result. The 1-octene content of this polymer was 9.4 mol %. The Mw and Mw/Mn values for this polymer could not be obtained since this polymer could not be dissolved in o-dichlorobenzene.

Comparative Example 2

Copolymerization of Ethylene and 1-Octene

1̂ Production of Product Comparative to Reaction Product (f)

1.0 g (3.0 mmol) of 2,2'-methylenebis(6-t-butyl-4-methylphenol), with which the (B) in the general formula (4) given above is a carbon atom which is a constituent atom that is outside the scope of the present invention, was used in place of compound (e) and the same reaction as that of 1̂ of example 1 was carried out to obtain 0.87 g of reaction product.

2̂ Copolymerization of Ethylene and 1-Octene

Besides using 6.6 mg of the reaction product obtained in 1̂, polymerization was carried out in the same manner as 2̂ of example 1. As a result, a polymer was not obtained.

Comparative Example 3

Copolymerization of Ethylene and 1-Octene

1̂ Production of product comparative to reaction product (f)

Besides using vanadium tetrachloride, which is outside the scope of this invention with respect to general formula (3), in place of compound (d), the same reaction as that of 1 of example 1 was carried out to obtain 1.2 g of reaction product.

2 Copolymerization of Ethylene and 1-Octene

Besides using 7.2 mg of the reaction product obtained in 1̂, polymerization was carried out in the same manner as 2̂ of example 1. 0.98 g of polymer was obtained as a result. The 1-octene content of this polymer was 18.1 mol %. The Mw and Mw/Mn values for this polymer could not be obtained since this polymer could not be dissolved in o-dichlorobenzene.

Comparative Example 4

Copolymerization of Ethylene and Propylene

Besides using methyl aluminoxane in place of trimethylaluminum and not using compound (c), polymerization was carried out in the same manner as in example 4. However, a polymer could not be obtained with this reaction.

Comparative Example 5

Copolymerization of Ethylene and Propylene

Besides using 0.5 mmol of methyl aluminoxane, polymerization was carried out in the same manner as in comparative example 4. 10.1 g of polymer was obtained as a result. The 1-octene content of this polymer was 33.5 mol %. The Mw and Mw/Mn values for this polymer could not be obtained since this polymer could not be dissolved in o-dichlorobenzene.

Comparative Example 6

Copolymerization of Ethylene and 1-Octene

1̂ Preparation of Reaction Product (f)

2,2'-thiobis(6-t-butyl-4-methylphenoxy)titanium dichloride was synthesized in accordance to the literature (Makromol. Chem., Rapid Commun. 10, 349 (1989)).

2̂ Copolymerization of Ethylene and 1-Octene

Ethylene and 1-octene were copolymerized in the same manner as example 2 with the exception that 2.4 mg of the 2,2'-thiobis(6-t-butyl-4-methylphenoxy)titanium dichloride obtained in 1̂ were used. 0.53 g of polymer were obtained as a result. The 1-octene content of this polymer was 8.9 mol %. The Mw and Mw/Mn values for this polymer could not be obtained since this polymer could not be dissolved in o-dichlorobenzene.

Effects of the Examples and the Comparative Examples

As can be seen from the results shown in Tables 1 and 2, with examples 1–3 and examples 7–10, the use of the catalysts of this invention enabled copolymers of high 1-octene contents of 24.4 to 27.9 mol % to be obtained even with 1-octene, which is normally difficult to copolymerize. A comparison with the 1-octene content of 9.4 mol % of comparative example 1 shows that the catalysts of the example provide a copolymerization ability of 2.5 times or more. Furthermore, for propylene and 1-butene, copolymers of high polymerization property can be obtained with which the respective contents are 42.9 to 52.0 mol %.

The examples also show that polymers of high weight average molecular weights of $5.8 \times 10^5$ to $16.4 \times 10^5$ can be obtained. In particular, examples 1 and 2 show that the use of trimethylaluminum {compound (b)} and N,N-dimethylanilinium tetrakis(pentafluorophenyl)borate {compound (c)} in the polymerization of ethylene and 1-octene enables polymers of especially high weight average molecular weights of $8.3 \times 10^5$ to $16.4 \times 10^5$ to be obtained. Also, example 5 shows that a polymer of a high weight average molecular weight of $11.9 \times 10^5$, can be obtained even in the case of polymerization of ethylene and 1-butene, with which a polymer of relatively high molecular weight is difficult to obtain.

Examples 2,4 and 7–9 show that even when the usage amount of compound (b), which is an organic aluminum compound, and the like., is as small as 50 $\mu$ mol, adequate amounts of polymer of 16.3 to 25.3 g can be obtained and that copolymers of high α-olefin contents of 26.8 mol % or more can be obtained. On the other hand, with comparative example 1, since compound (c) was not used, the amount of polymer obtained was minute and the α-olefin content was only 9.4 mol %, indicating the low copolymerization property.

Since a compound that did not contain a heteroatom in B of compound (e) was used in comparative example 2, the polymer cannot obtained. Further, since a compound with which an oxygen atom was not double bonded to vanadium and which therefore falls outside the scope of the invention was used as compound (d) in comparative example 3, the amount of compound obtained was approximately 1/30 th that of example 1. Also with comparative example 6, since a titanium compound, which falls outside the scope of this invention, was used as compound (a), the amount of polymer obtained was minute and the α-olefin content thereof was 8.9 mol %, indicating that the polymer was low in copolymerization properties. These show that compounds having an oxygen atom double bonded to a vanadium atom exhibit high catalytic activities.

What is claimed is:

1. A method for producing an olefin polymer, comprising:
   polymerizing an olefin using a polymerization catalyst which comprises a compound (a), an organic aluminum compound (b), and an ionic compound (c);
   wherein said olefin is an ethylene/α-olefin mixture that contains ethylene and an α-olefin other than ethylene;
   wherein compound (a) is represented by formula (1)

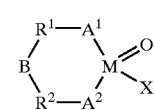

(1)

wherein each of $A^1$ and $A^2$ has an atom which is bonded to M;
   wherein $A^1$ and $A^2$ are selected from the group consisting of a substituted nitrogen atom, an oxygen atom, a substituted silicon atom, a substituted phosphorus atom, a sulfur atom and a substituted sulfur atom;
   wherein $A^1$ and $A^2$ may be the same or different;
   wherein each of $R^1$ and $R^2$ is a hydrocarbon group with 1 to 20 carbons or a hydrocarbon group with 1 to 20 carbons and containing a heteroatom;
   wherein $R^1$ and $R^2$ may be bonded together and may be the same or different;
   wherein B has an atom which is bonded with said $R^1$ and $R^2$;
   wherein B is selected from the group consisting of a substituted nitrogen atom, an oxygen atom, a substituted phosphorus atom, a sulfur atom, a substituted sulfur atom, a substituted silicon atom, and a carbon which is part of a carbonyl group;
   wherein M is a metal atom of group 5 of the periodic table;

wherein X has an atom which is bonded with M;
wherein said atom of X is selected from the group consisting of a halogen atom, a carbon atom, a substituted nitrogen atom, an oxygen atom, a substituted silicon atom, a substituted phosphorus atom, a sulfur atom and a substituted sulfur atom;
wherein said organic aluminum compound (b) is at least one compound selected from the group consisting of organic aluminum compounds represented by formula (2):

$(R^3)_n AlZ_{3-n}$  (2)

wherein $R^3$ is a hydrocarbon group with 1 to 20 carbon atoms;
wherein Z is a hydrogen atom, a hydrogen atom, or an alkoxyl group; and
wherein n has a value of 1 to 3.

2. The method according to claim 1, wherein said ionic compound (c) has at least one anion and at least one cation at the same time in the molecule.

3. An olefin polymer production method as defined in claim 2, wherein said ionic compound (c) is represented by formula (9);

$\{(L)^{k+}\}_p\{(M'A^1A^2 \cdots A^n)^-\}_q$  (9)

wherein $(L)^{k+}$ is a cation;
wherein M' is an element selected from the group consisting of the elements of groups 13, 14 and 15 of the periodic table;
wherein each of $A^1, A^2, \cdots A^n$ is selected from the group consisting of a hydrogen atom, a halogen atom, an alkyl group with 1 to 20 carbons, a dialkylamino group with 1 to 30 carbons, an alkoxyl group with 1 to 20 carbons, an aryl group with 6 to 40 carbons, an aryloxy group with 6 to 40 carbons, an alkaryl group with 7 to 40 carbons, an aralkyl group with 7 to 40 carbons, a halogen-substituted hydrocarbon group with 1 to 40 carbons, an acyloxy group with 1 to 20 carbons, and an organometalloid group;
wherein each of $A^1, A^2, \cdots A^n$ may be the same or different;
wherein k is the valence number of L and is a integer from 1 to 3;
wherein p is an integer equal to or greater than 1 that satisfies q=(k×p).

4. The method according to claim 1, wherein said α-olefin is at least one compound selected from the group consisting of propylene, 1-butene, 1-hexene, 4-methyl-1-pentene, 1-heptene, 1-octene, 1-decene and a mixture thereof.

5. The method according to claim 1, wherein said M is vanadium; and
wherein said ionic compound (c) is at least one compound selected from the group consisting of trialkylammonium tetraphenylborates, N,N-dialkylanilinium tetraphenylborates, alkylpyridinium tetraphenylborates, alkyl(2-cyanopyridinium) tetraphenylborates, alkyl(4-cyanopyridinium) tetraphenylborates, triphenylcarbenium tetraphenylborate, ferrocenium tetraphenylborate, trialkylammonium tetrakis(pentafluorophenyl)borates, N,N-dialkylanilinium tetrakis(pentafluorophenyl) borates, alkylpyridinium tetrakis(pentafluorophenyl) borates, alkyl(2-cyanopyridinium) tetrakis (pentafluorophenyl)borates, alkyl(4-cyanopyridinium) tetrakis(pentafluorophenyl)borates, triphenylcarbenium tetrakis(pentafluorophenyl)borate, ferrocenium tetrakis(pentafluorophenyl)borate, N,N-dialkylanilinium tetrakis[3,5-bis(trifluoromethyl) phenyl]borates, triphenylalkyl tetrakis[3,5-bis (trifluoromethyl)phenyl]borates, silver tetraphenylborate, sodium tetraphenylborate, silver tetrafluoroborate, and triphenylcarbenium tetrafluoroborate.

6. A method for producing an olefin polymer, comprising:
polymerizing an olefin using a polymerization catalyst which comprises
a reaction product (f) which is obtained by reacting a compound (d) represented by formula (3) and a compound (e) represented by formula (4);
an organic aluminum compound (b); and
an ionic compound (c);
wherein said olefin is an ethylene/α-olefin mixture that contains ethylene and an α-olefin other than ethylene;
wherein compound (d) is:

$M(O)X_3$  (3)

wherein M is a metal atom of group 5 of the periodic tale;
wherein X has au atom;
wherein said atom of X is bonded with M;
wherein said atom of X is selected from the group consisting of a halogen atom, a carbon atom, a substituted nitrogen atom, an oxygen atom, a substituted silicon atom, a substituted phosphorus atom, sulfur atom and a substituted sulfur atom;
wherein compound (e) is:

$C^1—A^1—R^1—B—R^2—A^2—C^2$  (4)

wherein each of $A^1$ and $A^2$ has an atom which is bonded to $C^1$ or $C^2$;
wherein $A^1$ and $A^2$ are selected from the group consisting of a substituted nitrogen atom, an oxygen atom, a substituted silicon atom, a substituted phosphorus atom, a sulfur atom and a substituted sulfur atom, and
wherein each of $A^1$ and $A^2$ may be the same or different;
wherein each of $R^1$ and $R^2$ is a hydrocarbon group with 1 to 20 carbons or a hydrocarbon group with 1 to 20 carbons and containing a heteroatom;
wherein $R^1$ and $R^2$ may be bonded together and may be the same or different;
wherein B has an atom which is bonded to said $R^1$ and $R^2$;
wherein said atom of B is selected from the group consisting of a nitrogen atom, an oxygen atom, a substituted phosphorus atom, a sulfur atom, a substituted sulfur atom, a substituted silicon atom, and a carbon atom which is part of a carbonyl group;
wherein each of $C^1$ and $C^2$ is an atom selected from the group consisting of a hydrogen atom, a lithium atom, a sodium atom, and a potassium atom;
wherein $C^1$ and $C^2$ may be the same or different;
wherein said organic aluminum compound (b) is at least one compound selected from the group consisting of organic aluminum compounds represented by formula (2):

$(R^3)_n AlZ_{3-n}$  (2)

wherein R³ is a hydrocarbon group with 1 to 20 carbon atoms;

wherein Z is the hydrogen atom, a halogen atom, or an alkoxyl group; and wherein n has a value of 1 to 3.

7. The method according to claim 6, wherein said ionic compound (c) has at least one anion and at least one cation at the same time in the molecule.

8. The method according to claim 7, wherein said ionic compound (c) is represented by formula (9);

$$\{(L)^{k+}\}_p\{(M'A^1A^2\cdots A^n)^{-}\}_q$$

wherein $(L)^{k+}$ is a cation;

wherein M' is an element selected from the group consisting of elements of groups 13, 14 and 15 of the periodic table;

wherein each of $A^1, A^2, \cdots A^n$ is selected from the group consisting of a hydrogen atom, a halogen atom, an alkyl group with 1 to 20 carbons, a dialkylamino group with 1 to 30 carbons, an alkoxyl group with 1 to 20 carbons, an aryl group with 6 to 40 carbons, an aryloxy group with 6 to 40 carbons, an alkaryl group with 7 to 40 carbons, an aralkyl group with 7 to 40 carbons, a halogen-substituted hydrocarbon group with 1 to 40 carbons, an acyloxy group with 1 to 20 carbons, and an organometalloid group;

wherein each of $A^1, A^2, \cdots A^n$ may be the same or different;

wherein k is the valence number of L and is a integer from 1 to 3; and wherein p is an integer equal to or greater than 1 that satisfies q=(k×p).

9. The method according to claim 6, wherein said α-olefin is at least one compound selected from the group consisting of propylene, 1-butene, 1-hexene, 4-methyl-1-pentene, 1-heptene, 1-octene, 1-decene and a mixture thereof.

10. The method according to claim 6, wherein said M is vanadium; and wherein said ionic compound (c) is at least one compound selected from the group consisting of trialkylammonium tetraphenylborates, N,N-dialkylanilinium tetraphenylborates, alkylpyridinium tetraphenylborates, alkyl(2-cyanopyridinium) tetraphenylborates, alkyl(4-cyanopyridinium) tetraphenylborates, triphenylcarbenium tetraphenylborate, ferrocenium tetraphenylborate, trialkylammonium tetrakis(pentafluorophenyl)borates, N,N-dialkylanilinium tetrakis(pentafluorophenyl) borates, alkylpyridinium tetrakis(pentafluorophenyl) borates, alkyl(2-cyanopyridinium) tetrakis (pentafluorophenyl)borates, alkyl(4-cyanopyridinium) tetrakis(pentafluorophenyl)borates, triphenylcarbenium tetrakis(pentafluorophenyl)borate, ferrocenium tetrakis(pentafluorophenyl)borate, N,N-dialkylanilinium tetrakisborates, triphenylalkyl tetrakisborates, silver tetraphenylborate, sodium tetraphenylborate, silver tetrafluoroborate, and triphenylcarbenium tetrafluoroborate.

* * * * *